US010120124B2

United States Patent
Niu et al.

(10) Patent No.: US 10,120,124 B2
(45) Date of Patent: Nov. 6, 2018

(54) BACKLIGHT MODULE, METHOD OF ASSEMBLING THE BACKLIGHT MODULE, AND DISPLAY DEVICE

(71) Applicants: BOE TECHNOLOGY GROUP CO., LTD., Beijing (CN); K-TRONICS (SUZHOU) TECHNOLOGY CO., LTD., Suzhou, Jiangsu Province (CN)

(72) Inventors: Shaofeng Niu, Beijing (CN); Rongshun Zhang, Beijing (CN); Chuanbo Zou, Beijing (CN)

(73) Assignees: BOE TECHNOLOGY GROUP CO., LTD., Beijing (CN); K-TRONICS (SUZHOU) TECHNOLOGY CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 15/345,807

(22) Filed: Nov. 8, 2016

(65) Prior Publication Data

US 2017/0212300 A1 Jul. 27, 2017

(30) Foreign Application Priority Data

Jan. 25, 2016 (CN) .......................... 2016 1 0049714

(51) Int. Cl.
*F21V 8/00* (2006.01)
*G02F 1/1335* (2006.01)
*G02F 1/1333* (2006.01)

(52) U.S. Cl.
CPC ........... *G02B 6/0088* (2013.01); *G02B 6/009* (2013.01); *G02F 1/133608* (2013.01);
(Continued)

(58) Field of Classification Search
CPC .... G02B 6/0086; G02B 6/0088; G02B 6/009; G02B 6/0091; G02F 1/133308; G02F 1/133608; G02F 1/133615
See application file for complete search history.

(56) References Cited

U.S. PATENT DOCUMENTS 7,241,041 B2 * 7/2007 Lo ........................ G02B 6/0088
349/58
7,325,963 B2 * 2/2008 Chang .................... G02B 6/009
349/60

(Continued)

FOREIGN PATENT DOCUMENTS

| CN | 101295098 A | 10/2008 |
|----|-------------|---------|
| CN | 103162194 A | 6/2013 |
| CN | 205351018 U | 6/2016 |

OTHER PUBLICATIONS

The First Chinese Office Action dated Mar. 19, 2018; Appln. No. 201610049714.0.

*Primary Examiner* — Alexander Garlen
(74) *Attorney, Agent, or Firm* — Ladas & Parry LLP

(57) ABSTRACT

A backlight module, a method of assembling the backlight module, and a display device are disclosed. The backlight module includes a fixing frame that has a light exit and a side plate provided with a first opening; an optical unit that is inserted into the fixing frame through the first opening and has a light emitting side opposite to the light exit; and a sealing piece that is engaged with the first opening to close the first opening. Embodiments of the present disclosure can reduce the manufacture difficulty and also material cost of the backlight module.

13 Claims, 7 Drawing Sheets

(52) U.S. Cl.
CPC ...... *G02B 6/0086* (2013.01); *G02F 1/133308* (2013.01); *G02F 1/133615* (2013.01)

(56) References Cited

U.S. PATENT DOCUMENTS

| | | | |
|---|---|---|---|
| 7,724,317 B2* | 5/2010 | Kim | G02F 1/133308 349/58 |
| 2005/0254261 A1 | 11/2005 | Lo et al. | |
| 2006/0072345 A1* | 4/2006 | Ho | G02B 6/0071 362/633 |
| 2006/0139963 A1 | 6/2006 | Chang et al. | |
| 2008/0278656 A1* | 11/2008 | Yuan | G02F 1/133608 349/58 |
| 2013/0155717 A1* | 6/2013 | Jeong | G02F 1/133308 362/602 |
| 2014/0168565 A1* | 6/2014 | Wu | G02F 1/133308 349/58 |
| 2014/0362325 A1* | 12/2014 | Lee | G02F 1/133308 349/58 |

* cited by examiner

BACKLIGHT MODULE, METHOD OF ASSEMBLING THE BACKLIGHT MODULE, AND DISPLAY DEVICE

TECHNICAL FIELD

Embodiments of the present disclosure relate to a backlight module, a method of assembling the backlight module, and a display device.

BACKGROUND

Liquid Crystal Display (LCD) device has been widely applied because of its advantages such as thinner body, lower power consumption and zero radiation. LCD devices in existing market mostly are manufactured in backlight mode including a LC panel and a backlight module. Considering the LC panel cannot emit light by its own, a light source provided by the backlight module is necessary to achieve normal display. Consequently, the backlight module has become one of key components of the LCD device.

Depending on a difference in a location where the light is incident, the backlight module is classified into direct-lit type backlight module and edge-lit type backlight module.

SUMMARY

At least one embodiment of the present disclosure provides a backlight module, a method of assembling the backlight module, and a display device which can reduce manufacturing difficulty and also material cost of the backlight module.

In order to achieve the above objective, the embodiments of the present disclosure utilize technical solutions as below.

On one aspect, the embodiment of the present disclosure provides a backlight module including: a fixing frame that has a light exit and a side plate provided with a first opening; an optical unit that is inserted into the fixing frame through the first opening and has a light emitting side opposite to the light exit; and a sealing piece that is engaged with the first opening to close the first opening.

On another aspect, the embodiment of the present disclosure provides a display device including the above-mentioned backlight module.

On yet another aspect, the embodiment of the present disclosure provides a method of assembling the above-mentioned backlight module provided with a light bar, including: inserting the optical unit into the fixing frame through the first opening; fixing the light bar onto the sealing piece; and engaging the sealing piece to the first opening, with the light bar facing towards an interior of the fixing frame, so as to close the first opening.

BRIEF DESCRIPTION OF THE DRAWINGS

Hereafter, the embodiments of the present disclosure will be described in detail with reference to the drawings, so as to make one person skilled in the art understand the present disclosure more clearly.

DETAILED DESCRIPTION

In order to make objects, technical details and advantages of the embodiments of the disclosure apparent, technical solutions according to the embodiments of the present disclosure will be described clearly and completely as below in conjunction with the accompanying drawings of embodiments of the present disclosure. It is to be understood that the described embodiments are only a part of but not all of exemplary embodiments of the present disclosure. Based on the described embodiments of the present disclosure, various other embodiments can be obtained by those of ordinary skill in the art without creative labor and those embodiments shall fall into the protection scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected" "couple/coupling/coupled" or the like, are not intended to define a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1:
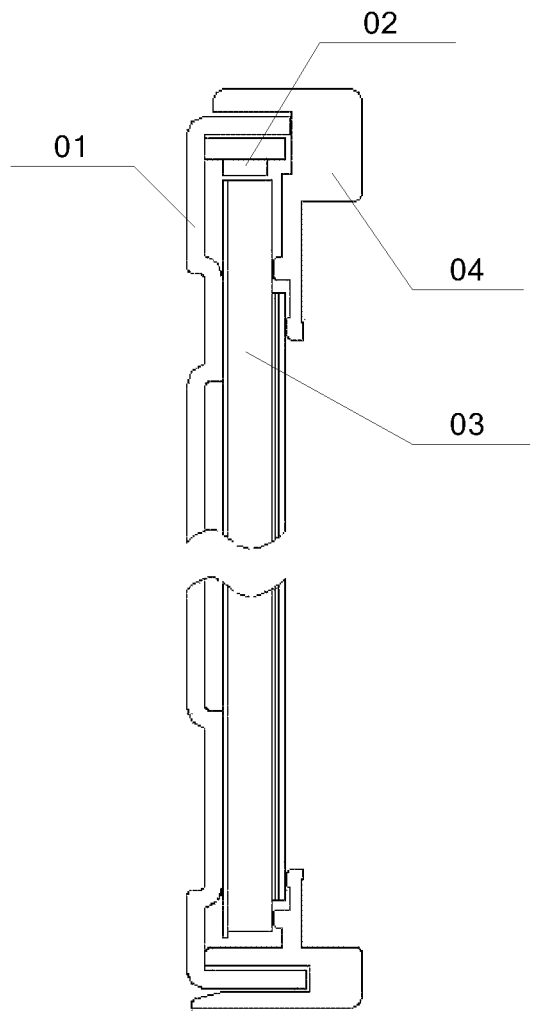
FIG. 1 is a schematically structural view of a backlight module.

FIG. 1 illustrates a structure of an edge-lit type backlight module, including a back plate 01, a light bar 02 disposed on an inner side of the back plate 01, an optical unit disposed in the back plate 01 opposite to the light bar 02, and a rubber frame 04 configured to cooperate with the back light 01 so as to position the optical unit 03. Light emitted from the light bar 02 enters the optical unit 03 via a light incident side thereof and then exits the optical unit 03 as a surface light source which is to be supplied to the LC panel. Such backlight module requires cooperation of the back plate and the rubber frame to position the optical unit, which results in increased manufacture difficulty and also higher material cost because of the hard mold-open process and expensive material for the back plate.

An embodiment of the present disclosure provides a backlight module 1, as illustrated in FIGS. 2-10, the backlight module 1 includes a fixing frame 10 having a light exit 12 and a side plate 15 provided with a first opening 11; an optical unit 20 inserted into the fixing frame 10 through the first opening, wherein a light emitting side of the optical unit 20 is opposite to the light exit 12 of the fixing frame 10; and a sealing piece 30 configured to be engaged with the first opening 11 so as to close the first opening 11. In this way, the optical unit 20 is positioned in the fixing frame 10 by the cooperation between the fixing frame 10 and the sealing piece 30.

Figure 2:
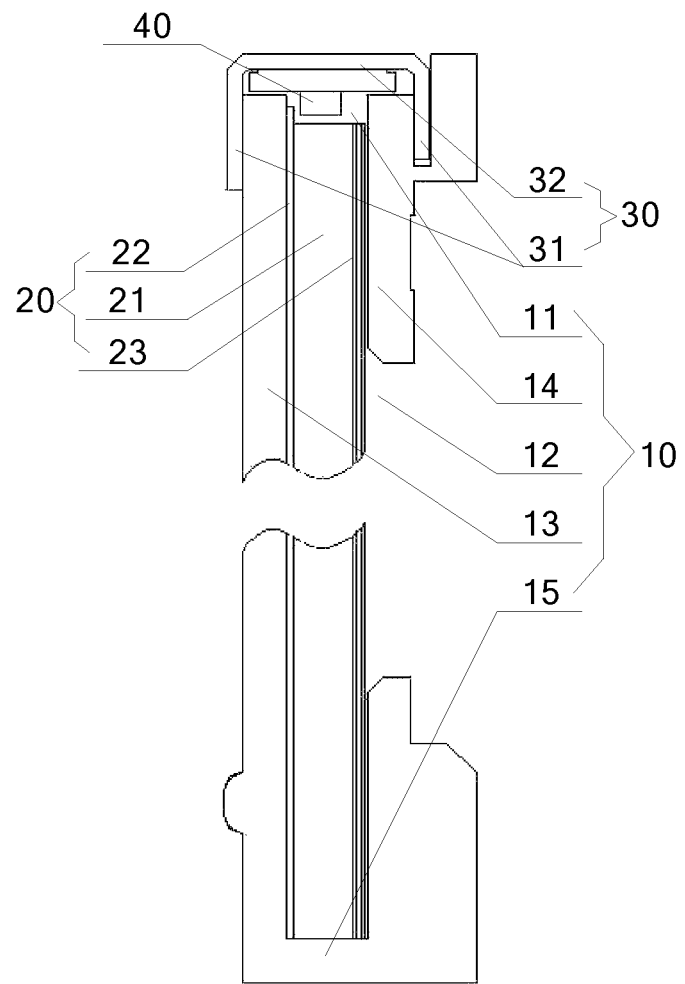
FIG. 2 is a cross-sectional diagram illustrating a backlight module provided by an embodiment of the present disclosure.
Figure 3:
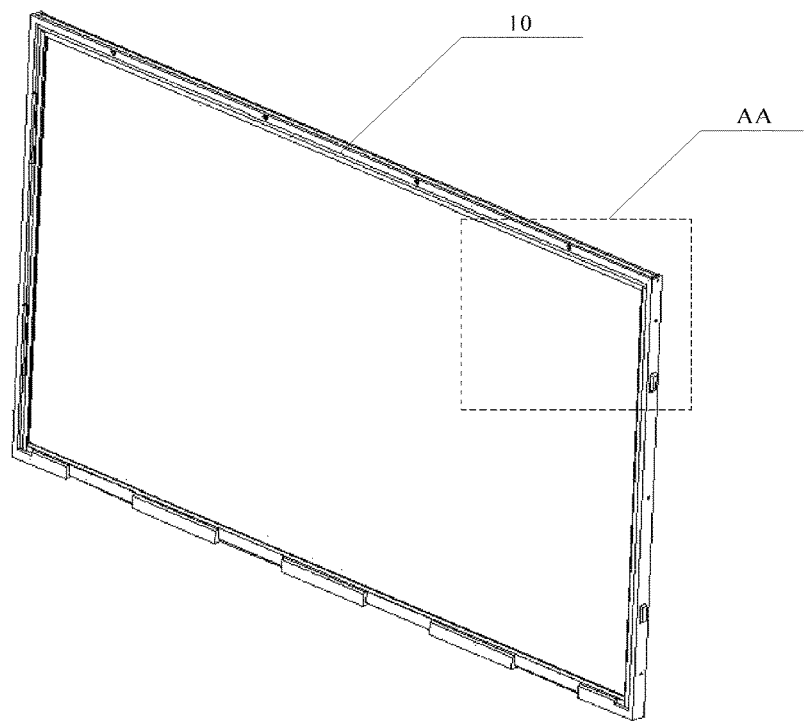
FIG. 3 is a schematically structural view of a fixing frame in the backlight module provided by the embodiment of the present disclosure.

As illustrated in FIG. 2, the side plate 15 of the fixing frame 10 is provided with the first opening 11, through which the optical unit 20 is inserted into the fixing frame 10. Subsequently, the first opening 11 can be closed by the sealing piece 30 engaging with the first opening 11, wherein the sealing piece 30 can be provided with a light source such as a light bar 40 on a surface facing towards an interior of the fixing frame 10. In this way, the optical unit 20 is positioned in the fixing frame 10 by the cooperation between the fixing frame 10 and the sealing piece 30.

As above, the backlight module provided by the embodiment of the present disclosure utilizes fixing frame and sealing piece that are easier in mold-open and cost-effective in material to replace the back plate and rubber frame as utilized in the solution of FIG. 1, so as to reduce the manufacture difficulty and also material cost of the backlight module.

In an example, as illustrated in FIG. 2, the fixing frame 10 includes a support plate 13 and a limit plate 14 disposed in opposite to the support plate 13, wherein the support plate 13 and the limit plate 14 are spaced by a side plate 15 disposed along a circumstance of the support plate 13, and the side plate 15 is connected to both of the support plate 13 and the limit plate 14; the light exit 12 is disposed in the limit plate 14. As above, the light exit 12 of the fixing frame 10 in the embodiment of the present disclosure is located in opposite to the light emitting side of the optical unit 20, thus in practical manufacture process, the light exit 12 can be designed to have larger size so that the limit plate 14 would less block the light emitting side of the optical unit 20, which increases the luminous efficiency of the backlight module 1.

In the embodiment of the present disclosure, the fixing frame 10 can be made of various materials, including but not limited to, wood, plastic or synthetic resin, without particularly defining herein. In an example, the fixing frame 10 is made of synthetic resin which is prevented from water and oxygen, easy in mold-open and also cost-effective.

It's to be noted that, the fixing frame 10 can be formed by the support plate 13, the limit plate 14 and the side plate 15 which are connected with each other; or can be formed integrally by injection molding process; without particularly defined in the embodiments of the present disclosure. An integrally formed structure not only eliminates operations of connecting and fixing, but also provides the fixing frame 10 with better firmness.

In an example, referring to FIGS. 2-10, the fixing frame 10 and the sealing piece 30 are cooperated with each other to position the optical unit 20 by means of: contacting an edge of the light emitting side of the optical unit 20 with the limit plate 40, contacting a surface of the optical unit 20 opposite to the light emitting side with the support plate 13, contacting a light incident side of the optical unit 20 with the light bar 40, and contacting all the remaining sides/faces of the optical unit 20 with the side plate 15.

In an example, referring to FIG. 2, the optical unit 20 includes a light guide plate 21; when the first opening 11 is closed by the sealing piece 30, the light bar 40 is brought to be opposite to the light guide plate 21.

In the embodiment of the present disclosure, the sealing piece 30 is configured to be engaged with the first opening 11 so as to close the first opening 11. A shape or material of the sealing piece 30 is not particularly defined in the embodiments of the present disclosure. In an example, considering the surface of the sealing piece 30 facing towards the interior of the fixing frame 10 is fixed with the light bar 40 which generates heat during operation, the sealing piece 30 is made of metallic material to provide better effect of heat dissipation, so to ensure a serve life of the backlight module 1.

In an example, referring to FIG. 2, apart from the light guide plate 21, the optical unit 20 further includes an optical film 23 located at a side of the light guide plate 21 adjacent to the light exit 12, and a reflector 22 located at a side of the light guide plate 21 far way from the light exit 12. In this way, when the first opening 11 is closed by the sealing piece 30 and the light bar 40 is brought to be opposite to the light guide plate 21, the light emitted by the light bar 40 enters the light guide plate 21 via a light incident side and then exits the light guide plate 21 via a light emitting side upon being reflected and diffused, and finally forms into a surface light source upon passing through the optical film 23.

In the embodiment of the present disclosure, the light bar 40 is fixed on the sealing piece 30 in various ways, including welding, gluing and the like, without particularly defining herein. In an example, the light bar 40 and the sealing piece 30 are adhered together by using thermal conductive adhesive, which can not only achieve fixing of the light bar 40 with the sealing piece 30 in a simpler way, but also can prevent the light bar 40 or the sealing piece 30 from damage during fixing; moreover, the use of the thermal conductive adhesive can further improve the thermal dissipation efficiency and the service life of the light bar 40.

In the embodiment of the present disclosure, the light bar 40 and the sealing piece 30 can be connected in various ways. By way of example, the sealing piece 30 can be adhered onto the fixing frame 10, or can be fixed with the fixing frame 10 by using screws, without particularly defined herein.

In an example, referring to FIG. 4, FIG. 6, FIG. 9 and FIG. 10, the backlight module further includes a fixer 50; a side edge 31 of the sealing piece 30 is provided with a first fixing hole 51, while at least one of the limit plate 14 and the support plate 13 is provided with a second fixing hole 52 corresponding to the first fixing hole 51; the fixer 50 can be inserted through the first fixing hole 51 and the second fixing hole 52 to fix the sealing piece 30 with the fixing frame 10. For example, the fixer 50 can be a screw, and correspondingly the first fixing hole 51 and the second fixing hole 52 both can be a threaded hole. By using thread connection, the sealing piece 30 and the fixing frame 10 can be connected more securely; furthermore, in case that a component such as the light bar 40 and the optical unit 20 is damaged, the sealing piece 30 can be detached from the fixing frame 10, which is convenient for repair of the backlight module. In an example, referring to FIG. 6 and FIG. 9, a plurality of first fixing holes 51 and a plurality of second fixing holes 52 can be disposed, wherein the first fixing holes 51 can be uniformly distributed on the side edge 31 of the sealing piece 30, and the second fixing holes 52 can be uniformly distributed on at least one of the limit plate 14 and the support plate 13 corresponding to the first fixing holes 51. In this way, the sealing piece 30 and the fixing frame 10 can be connected more securely.

In an example, referring to FIGS. 6-10, the sealing piece 30 can be formed as a U-shaped cover, including a bottom plate 32 and two groups of side edges 31, wherein each of the two groups includes two side edges 31 disposed in opposite to each other; when the U-shaped cover closes the first opening 11, the opposite side edges 31 in one of the two groups are contacted with an external surface of the side plate 15 of the fixing frame 10, while the two opposite side edges 31 in the other group are contacted with surfaces of the support plate 13 and the limit plate 14, respectively; in this way, the two groups of side edges 31 are all fixed with the fixing frame 10. As above, by fixing all the four side edges 31 of the sealing piece 30 with the fixing frame 10, the connection between the sealing piece 30 and the fixing frame 10 can be further enhanced.

Figure 11:
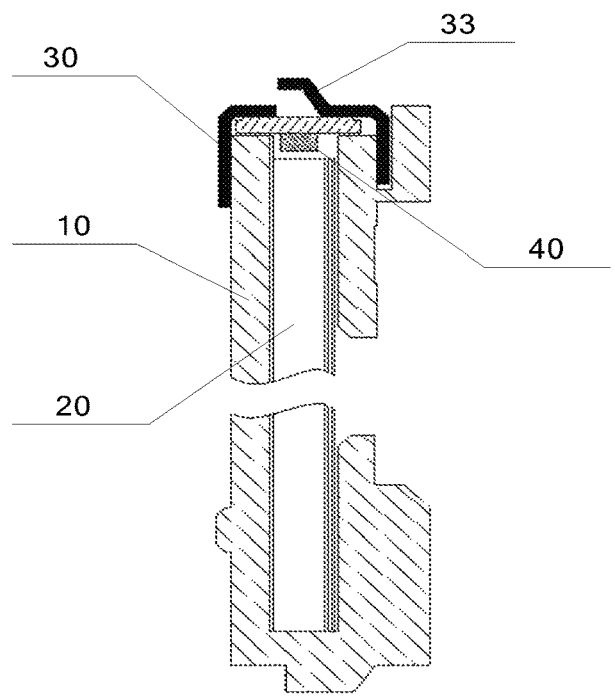
FIG. 11 is a cross-sectional diagram illustrating a backlight module provided by another embodiment of the present disclosure.

In an example, as illustrated in FIG. 11, a surface of the sealing piece 30 facing towards an exterior of the fixing frame 10 is provided with a hook 33, through which the backlight module 1 is connected to an external frame. When assembling the backlight module 1 with a display panel into a display device, it requires to connect the backlight module 1 to an external frame of the display device; by arranging the hook 33 on the surface of the sealing piece 30 facing towards the exterior of the fixing frame 10, the connection between the backlight module 1 and the display device can be achieved by hanging the external frame on the hook 33. For example, the hook 33 can be a separate component adhered or welded onto the surface of the sealing piece 30 facing towards the exterior of the fixing frame 10, or can be a structure integrally formed with the sealing piece 30, without particularly defined in the embodiments of the present disclosure. In the case where the hook 33 is a structure integrally formed with the sealing piece 30, it call be manufactured by a process including: firstly, forming a notch in the surface of the sealing piece 30 facing towards the exterior of the fixing frame 10, and then lifting structures surrounding the notch in the sealing piece 30 so as to form the hook 33.

As above, the backlight module provided by the embodiment of the present disclosure includes: a fixing frame that has a light exit and a side plate provided with a first opening; an optical unit that is inserted into the fixing frame and has a light emitting side opposite to the light exit; and a sealing piece that is engaged with the first opening to close the first opening. In this way, the optical unit is positioned in the fixing frame by the cooperation between the fixing frame and the sealing piece. By utilizing the fixing frame and the sealing piece that are easier in mold-open and cost-effective in material to replace the back plate and rubber frame in the solution of FIG. 1, both the manufacture difficulty and the material cost of the backlight module can be reduced.

Another embodiment of the present disclosure provides a display device including any of the foregoing backlight modules. In the backlight module of the display device provided by the embodiment of the present disclosure, the optical unit is positioned by cooperation between the fixing frame and the sealing piece. As a result, by utilizing the fixing frame and the sealing piece that are easier in mold-open and cost-effective in material to replace the back plate and rubber frame in the solution of FIG. 1, both the manufacture difficulty and the material cost of the backlight module can be reduced.

Figure 12:
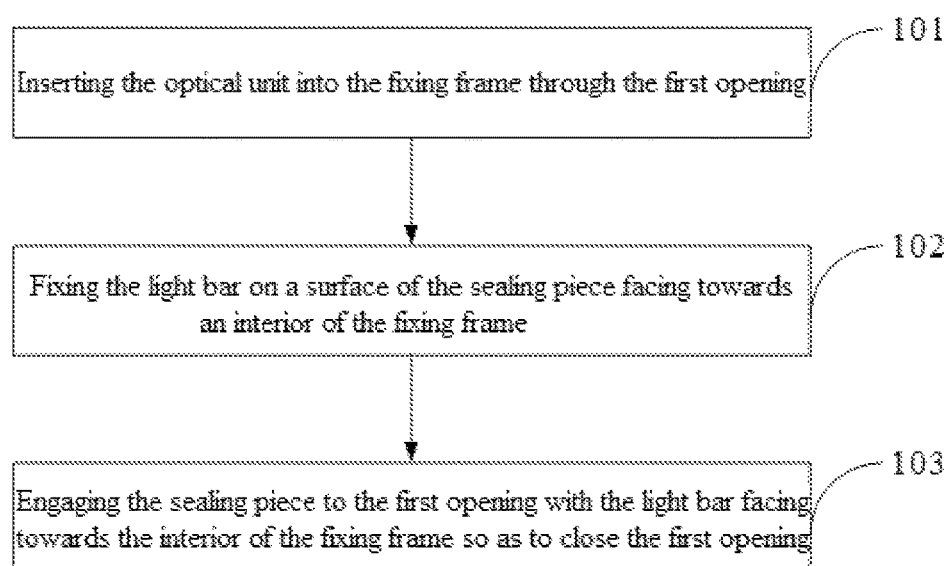
FIG. 12 is a flow chart illustrating a method of assembling the backlight module provided by an embodiment of the present disclosure.

Yet another embodiment of the present disclosure provides a method of assembling a backlight module, as illustrated in FIG. 12, the backlight module is any one of those illustrated in the foregoing embodiments. In case where the backlight module is provided with a light bar, the method includes steps as below.

Figure 4:
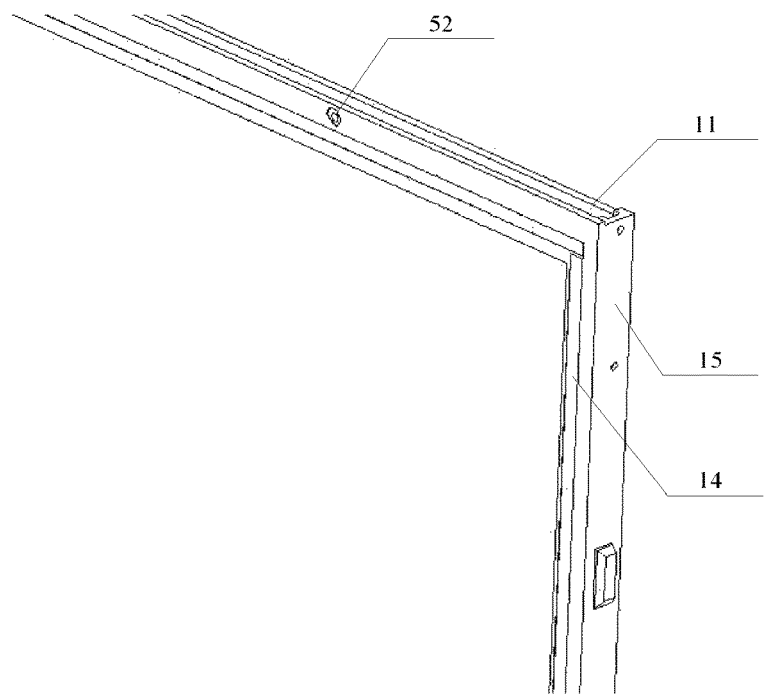
FIG. 4 is an enlarged view of a region "AA" in FIG. 3.
Figure 5:
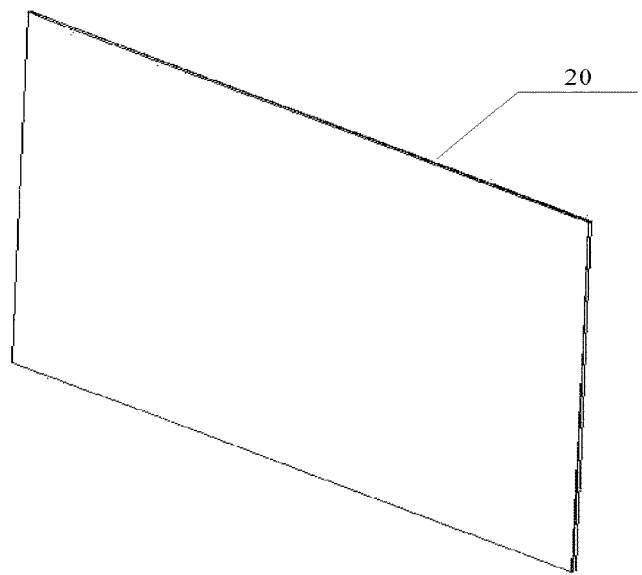
FIG. 5 is a schematically structural view of an optical unit in the backlight module provided by the embodiment of the present disclosure.
Figure 8:
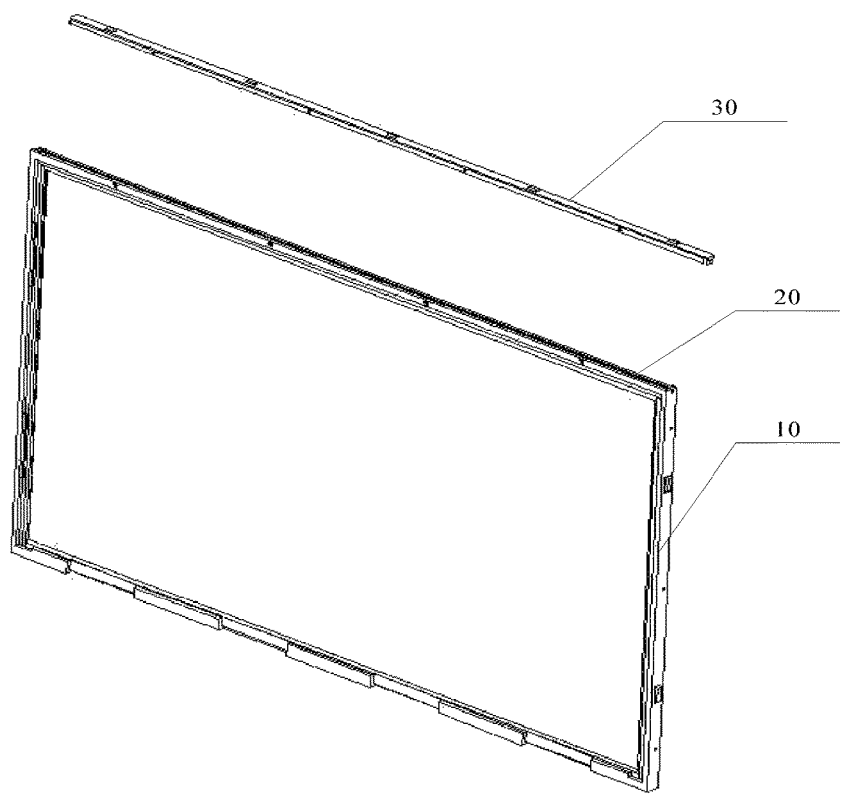
FIG. 8 is an exploded view illustrating the backlight module provided by the embodiment of the present disclosure.

Step S101, inserting the optical unit 20 into the fixing frame 10 through the first opening 11; such step can be performed as those described with reference to FIGS. 4, 5 and 8.

Figure 6:
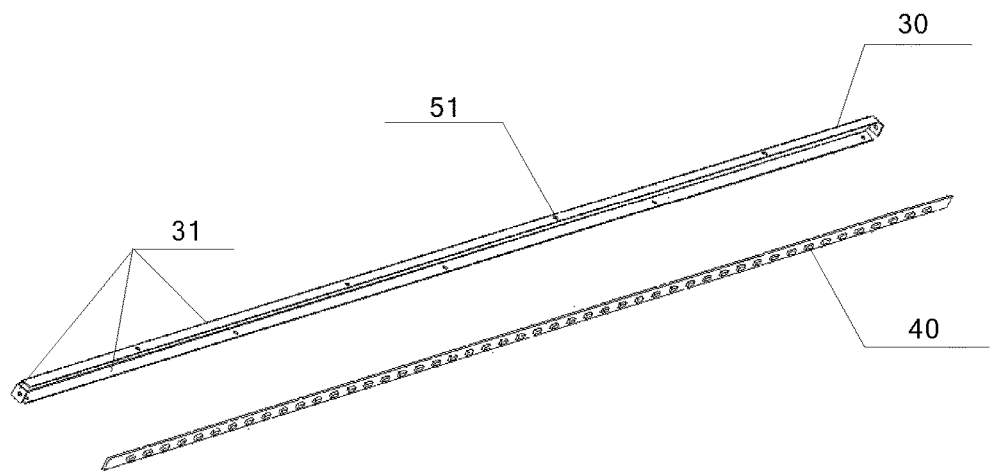
FIG. 6 is a schematic view illustrating a sealing piece separated from a light bar in the backlight module provided by the embodiment of the present disclosure.
Figure 7:
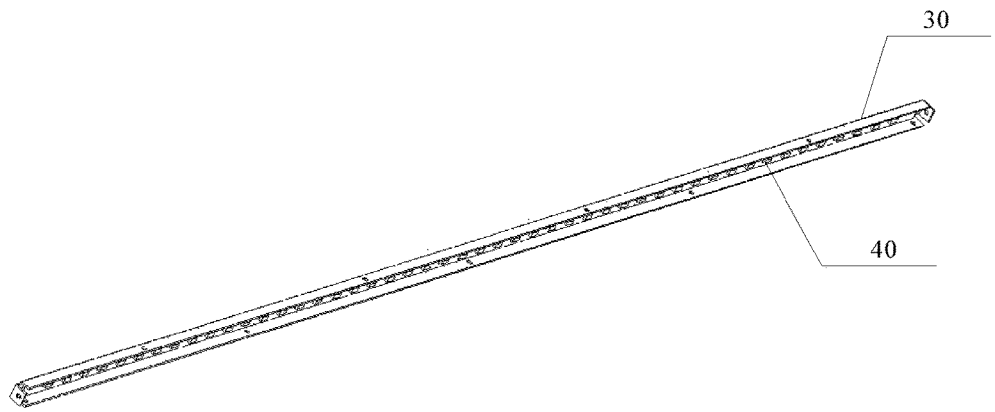
FIG. 7 is a schematic view illustrating a sealing piece adhered with a light bar in the backlight module provided by the embodiment of the present disclosure.

Step S102, fixing the light bar 40 on a surface of the sealing piece 30 facing towards an interior of the fixing frame 10; such step can be performed as those described with reference to FIGS. 6-7.

Figure 9:
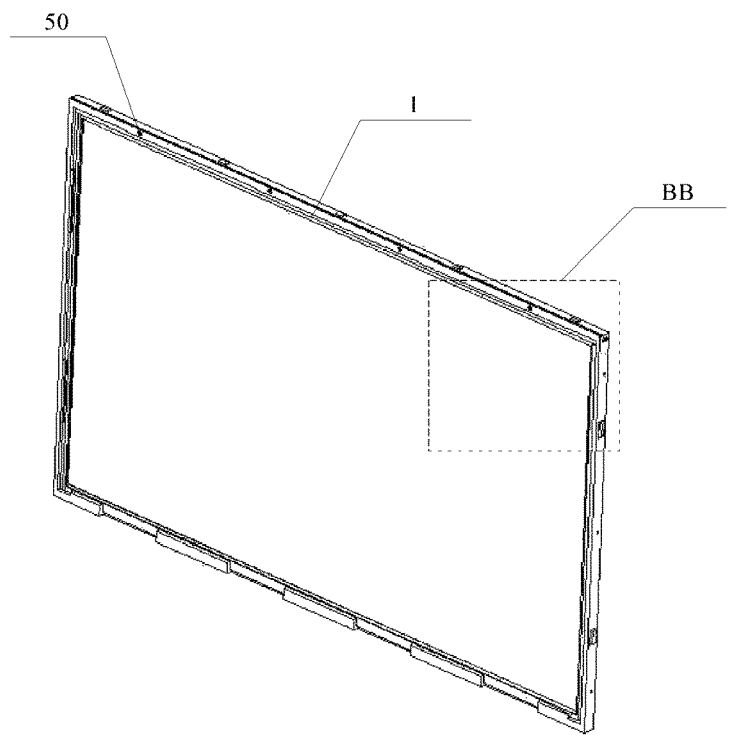
FIG. 9 is a schematically structure view of the backlight module provided by the embodiment of the present disclosure.
Figure 10:
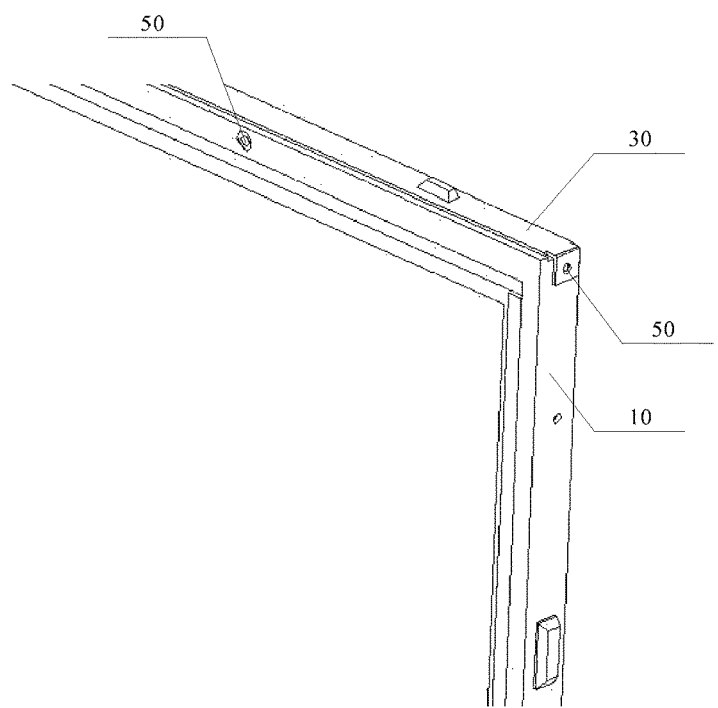
FIG. 10 is an enlarged view of a region "BB" in FIG. 9.

Step S103, engaging the sealing piece 30 to the first opening 11, with the light bar 40 facing towards the interior of the fixing frame 10, so as to close the first opening 11; such step can be performed as those described with reference to FIGS. 8-9.

As above, the method of assembling backlight module provided by the embodiment of the present disclosure positions the optical unit by the cooperation between the fixing frame and the sealing piece. As a result, by utilizing the fixing frame and the sealing piece that are easier in mold-open and cost-effective in material to replace the back plate and rubber frame in the solution of FIG. 1, both the manufacture difficulty and the material cost of the backlight module can be reduced.

The foregoing are merely specific embodiments of the disclosure, but not limitative to the protection scope of the disclosure. Within the technical scope disclosed by the present disclosure, any alternations or replacements which can be readily envisaged by one skilled in the art shall be within the protection scope of the present disclosure. Therefore, the protection scope of the disclosure shall be defined by the accompanying claims.

The present disclosure claims the benefits of Chinese patent application No. 201610049714.0, which was filed with the SIPO on Jan. 25, 2016 and is fully incorporated herein by reference as part of this application.

What is claimed is:

1. A backlight module, comprising:
   a fixing frame that has a light exit and a side plate provided with a first opening;
   an optical unit that is inserted into the fixing frame through the first opening and has a light emitting side opposite to the light exit in the fixing frame; and
   a sealing piece that is engaged with the first opening to close the first opening, wherein
   the fixing frame comprises a support plate and a limit plate disposed in opposite to the support plate,
   the support plate and the limit plate are spaced by the side plate, which is disposed along a circumstance of the support plate and is connected to both of the support plate and the limit plate, and
   the light exit is disposed in the limit plate, and wherein
   the sealing piece is provided with a hook at a surface facing towards an exterior of the fixing frame, the hook is formed by lifting structures surrounding a notch provided in the surface of the sealing piece facing towards the exterior of the fixing frame, and
   the backlight module is connected to an external frame through the hook.

2. The backlight module according to claim 1, wherein the optical unit comprises a light guide plate;
the sealing piece is provided with a light bar on a surface facing towards an interior of the fixing frame; and
upon the sealing piece closing the first opening, the light bar is opposite to the light guide plate.

3. The backlight module according to claim 2, wherein the light emitting side of the optical unit has an edge contacted with the limit plate, a side of the optical unit opposite to the light emitting side is contacted with the support plate, a light incident side of the optical unit is contacted with the light bar, and all the remaining sides of the optical unit are contacted with the side plate.

4. The backlight module according to claim 1, wherein the sealing piece is made of metallic material.

5. The backlight module according to claim 1, wherein the sealing piece further includes a side edge, and
upon the sealing piece closing the first opening, the side edge is contacted with an external surface of the fixing frame, and the sealing piece is fixed with the fixing frame through the side edge.

6. The backlight module according to claim 5, further comprising a fixer;
the side edge of the sealing piece is provided with a first fixing hole, and at least one of the limit plate and the support plate is provided with a second fixing hole corresponding to the first fixing hole; and
the fixer is configured to be passing through the first fixing hole and the second fixing hole to fix the sealing piece with the fixing frame.

7. The backlight module according to claim 5, wherein
the sealing piece is formed as a U-shaped cover, the U-shaped cover comprises a bottom plate and two groups of side edges connected to the bottom plate, each of the two groups of side edges comprises two side edges which are disposed in opposite to each other;
upon the U-shaped cover closing the first opening, the side edges in one of the two groups are contacted with an external surface of the side plate of the fixing frame, and the side edges in the other one of the two groups are contacted with the support plate and the limit plate, respectively; and
the two groups of side edges are all fixed with the fixing frame.

8. The backlight module according to claim 6, wherein a plurality of first fixing holes and a plurality of second fixing holes are provided; and
the first fixing holes are uniformly distributed on the side edge of the sealing piece, and the second fixing holes are uniformly distributed on at least one of the limit plate and the support plate corresponding to the first fixing holes.

9. The backlight module according to claim 6, wherein the fixer is a screw, and the first fixing hole and the second fixing hole both are threaded hole.

10. The backlight module according to claim 2, wherein the light bar is adhered to the sealing piece through thermal conductive adhesive.

11. A display device comprising the backlight module according to claim 1.

12. The backlight module according to claim 1, wherein the fixing frame is formed Integrally by Injection molding process from synthetic resin material.

13. A backlight module, comprising:
a fixing frame that has a light exit and a side plate provided with a first opening;
an optical unit that is inserted into the fixing frame through the first opening and has a light emitting side opposite to the light exit in the fixing frame; and
a sealing piece that is engaged with the first opening to close the first opening, wherein
the fixing frame comprises a support plate and a limit plate disposed in opposite to the support plate,
the support plate and the limit plate are spaced by the side plate, which is disposed along a circumstance of the support plate and is connected to both of the support plate and the limit plate, and
the light exit is disposed in the limit plate, and wherein
the fixing frame is made of synthetic resin material,
the sealing piece is provided with a hook at a surface facing towards an exterior of the fixing frame, the hook is formed by lifting structures surrounding a notch provided in the surface of the sealing piece facing towards the exterior of the fixing frame, and
the backlight module is connected to an external frame through the hook.

* * * * *